No. 782,754.  
Patented February 14, 1905.

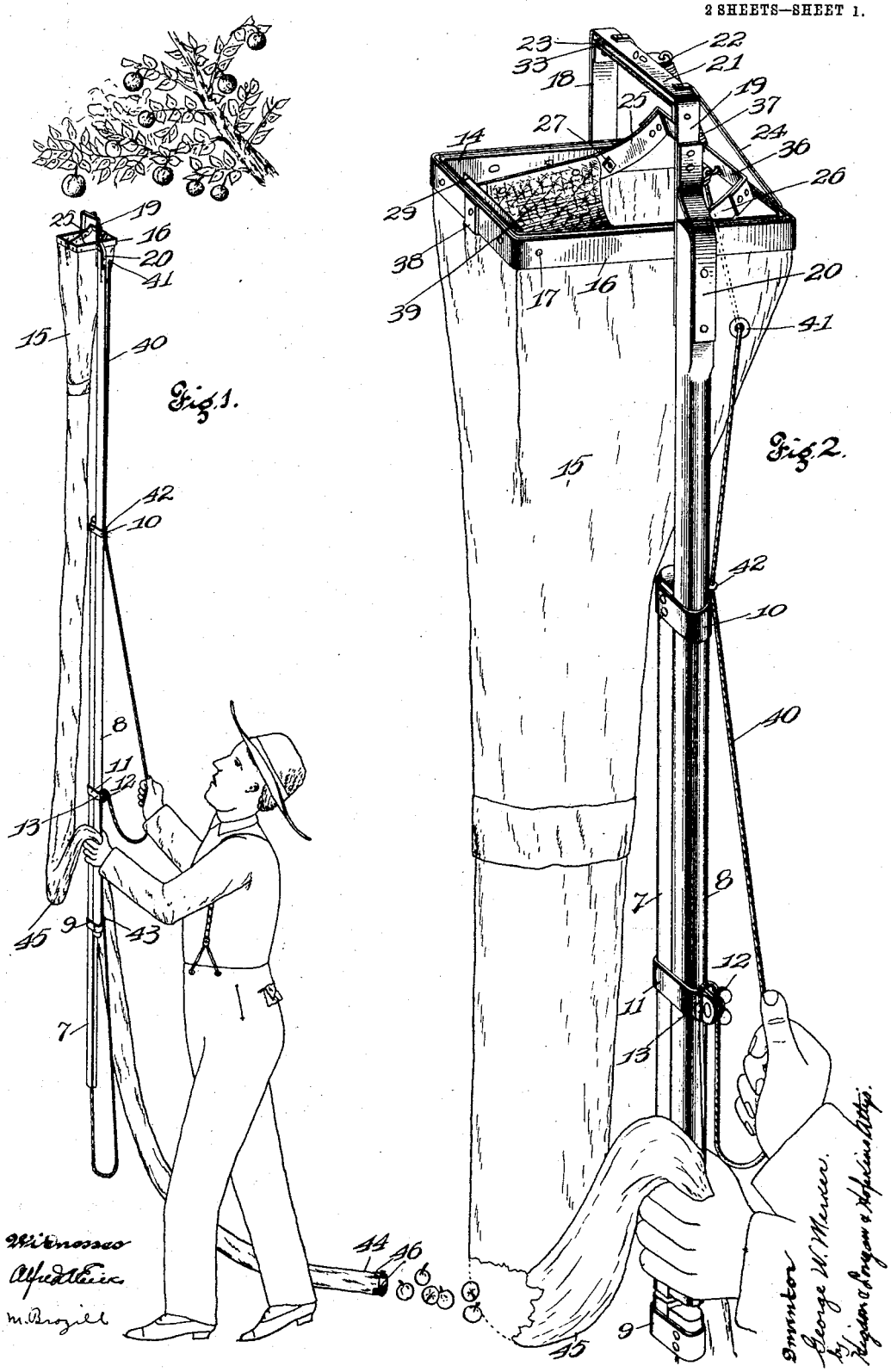

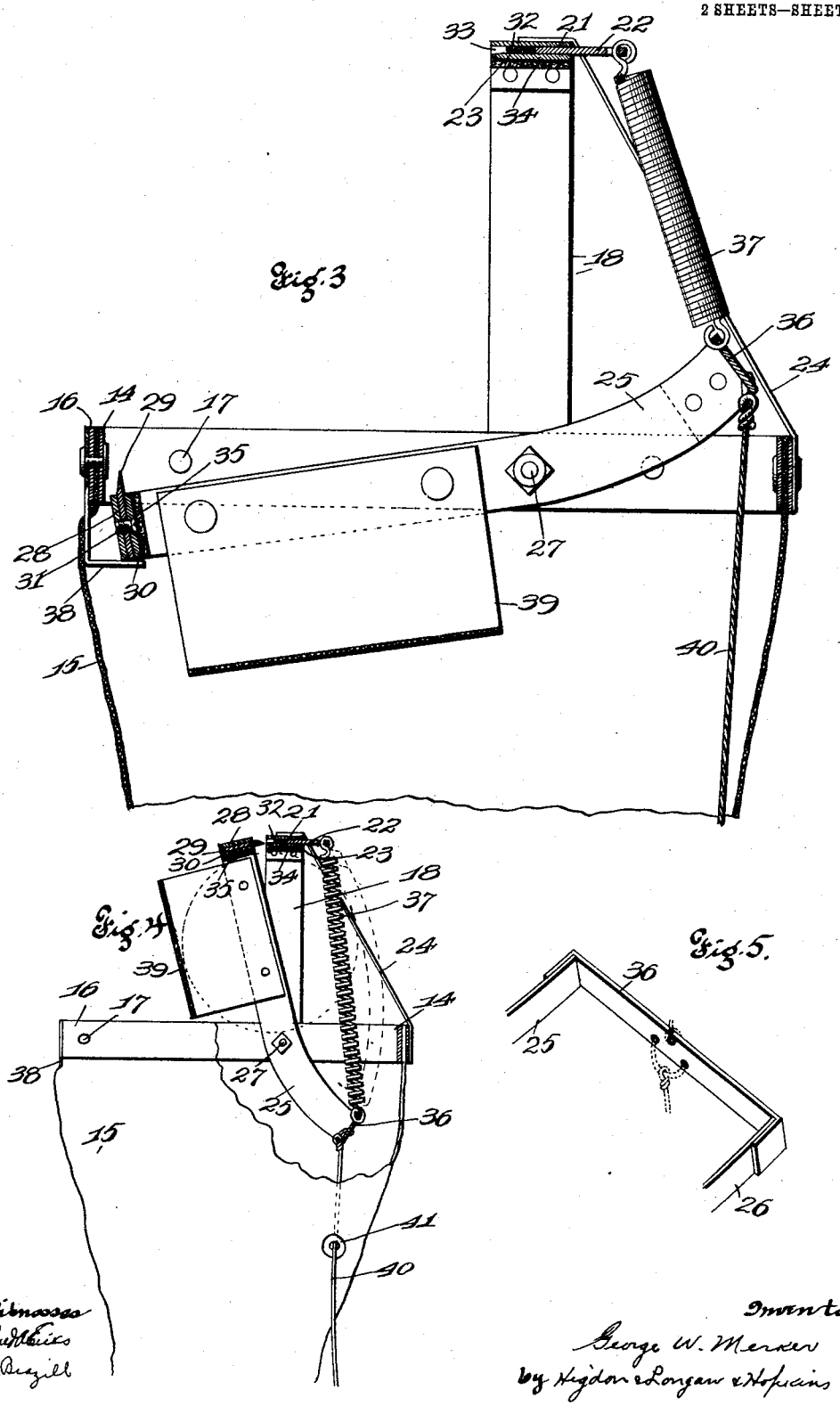

UNITED STATES PATENT OFFICE.

GEORGE W. MERKER, OF BELLEVILLE, ILLINOIS.

FRUIT-PICKER.

SPECIFICATION forming part of Letters Patent No. 782,754, dated February 14, 1905.

Application filed May 16, 1904. Serial No. 208,232.

*To all whom it may concern:*

Be it known that I, GEORGE W. MERKER, a citizen of the United States, and a resident of Belleville, St. Clair county, Illinois, have invented certain new and useful Improvements in Fruit-Pickers, of which the following is a specification containing a full, clear, and exact description, reference being had to the accompanying drawings, forming a part hereof.

My invention relates to fruit-pickers; and it consists of the novel features herein shown, described, and claimed.

In the drawings, Figure 1 is a perspective showing the operation of my improved fruit-picker. Fig. 2 is an enlarged detail perspective, parts being broken away to economize space. Fig. 3 is a sectional elevation of the head of the fruit-picker and showing the open position. Fig. 4 is a view analogous to Fig. 3 and showing the closed position. Fig. 5 is a perspective of the knife-operating bar.

Referring to the drawings in detail, the picker-head is attached to an extension-handle comprising the lower bar 7 and the upper bar 8, placed together side by side, and suitable means of holding said bars in position relative to each other. The means shown comprises the loop 9, attached to the lower end of the bar 8 and encircling the intermediate part of the bar 7, and the loop 10, attached to the upper end of the bar 7 and encircling the intermediate part of the bar 8. The clamp-loop 11 encircles the upper and lower bars between the loops 9 and 10, said loop 11 being controlled by a thumb-screw 12, so that when the thumb-screw 12 is loosened the bars 7 and 8 may be extended or contracted to adjust the length of the handle and so that when the thumb-screw is tightened the bars are held rigidly together in their adjusted position. A cord-bearing 13 is formed in the loop 11.

The rectangular inner frame 14 is placed in the upper end of the canvas tube 15, and the rectangular outer frame 16 is placed in position outside of the fabric, and said frames 14 and 16 are secured together by rivets 17, said rivets also passing through the fabric and securing the tube. Arms 18 and 19 extend upwardly from the frame 16 near its transverse center, the arm 19 being attached to the extreme upper end and inner face of the bar 8, and the brace 20 is attached to the upper end of the arm 19 and to the outer face of the bar 8. The outer rigid cutting-plate 21 connects the upper ends of the arms 18 and 19. The base of the ear 22 is inserted between the plates 21 and 23, and the inner rigid cutting-plate 23 connects the arms 18 and 19 below the ear 22. Braces 24 connect the ends of the plate 21 to the end of the frame 16. The knife-carrying levers 25 and 26 are mounted upon the pivots 27, said pivots passing through the frame at the lower ends of the arms 18 and 19, said levers being located against the inner faces of the sides of the frame 14. The outer swinging cutting-plate 28 connects the outer ends of the levers 25 and 26. The knife 29 is placed against the inner face of the plate 28, and the inner swinging cutting-plate 30 is placed against the lower face of the knife and secured to the outer plate by screws 31.

A cushion 32, of felt, is placed between the plates 21 and 23 in front of the ear 22, there being an opening 33 between said plates in front of the cushion, and the edge of the knife 29 swings into this opening against the cushion. A cushion 34 is secured against the lower face of the plate 23, and a similar cushion 35 is secured against the lower face of the plate 30. An operating-bar 36 connects the opposite ends of the levers 25 and 26 from the knife.

A retractile coil-spring 37 connects the operating-bar 36 to the ear 22, the tension of said spring being exerted to throw the levers 25 and 26 into a horizontal position, as shown in Fig. 3, and a stop 38 is secured to the frame in position to limit the downward motion of the knife under the influence of the spring. A canvas band 39 of considerable width connects the levers 25 and 26 immediately below the knife, so that when an apple or orange or similar fruit is to be picked the picker is manipulated to bring the fruit in front of the spring 37 below the rigid cutting-plates 21 and 23, and then the operating-bar 36 is pulled downwardly. The swinging cutting-plates 28 and 30 are swung upwardly, and the band 39 presses the fruit against the spring 37 at about the time that the knife is to sever the fruit from the tree. The fruit will also engage the cushions 34 and 35, and by said cushions the fruit will be kept from contacting with the metal. The tension of the spring 37 in opposition to the tension of the band 39 will hold the fruit steadily while it is being severed and will prevent bruising or damaging of the fruit.

An operating-cord 40 is attached to the center of the operating-bar 36 and extends downwardly through an eye 41 in the canvas tube 15, then downwardly outside of the tube through an eye 42, carried by the bar 8, and then downwardly through the bearing 13 and through an eye 43, and the lower end of the cord may be attached to the lower end of the bar 7, so as to be in convenient position for manual operation.

The canvas tube 15 is considerably longer than the longest dimension of the adjustable handle, so that the discharge end 44 of said tube will trail upon the ground behind the operator, as shown in Fig. 1. The operator after adjusting the handle to the desired length will grasp the tube in his left hand and then grasp the handle with the same hand, allowing the tube to sag above the hand, and then operate the cord with the right hand, as shown in Figs. 1 and 2. When the cord is pulled to sever the fruit, it will be held between the spring 37 and the band 39 until the cord is released, and then the fruit will drop into the tube and pass downwardly to the sagging part 45 of the tube, which is above the hand of the operator. Then the operator will release the tube and allow the fruit to pass downwardly to the ground, and then as the operation of picking goes on the fruit will work its way to the discharge end of the tube and pass outwardly upon the ground. Buttons 46 are secured to the lower end of the tube 15, so that an additional length of tube may be buttoned on when it is desired to use the picker on very high trees. This matter of trailing the tube a considerable length upon the ground is very important where it is desired to protect the fruit from bruising in falling.

In picking apples, pears, and the like the knife 29 is not required and may be removed. Then the stems of the fruit will be gripped between the cutting-plates 21 and 23 on one side and the plate 28 on the other side and may be pulled or broken from the tree. In picking oranges and similar fruit, where it is desired to cut the stem, the knife may be used.

I have found by actual practice that apples may be picked from the tallest trees and delivered upon the ground by the operation heretofore described without the slightest injury, and this matter of preserving the fruit from injury is the all-important consideration in constructing a fruit-picker.

I claim—

1. In a fruit-picker: a suitable frame; a handle for holding the frame; a rigid cutting-plate mounted above the frame; levers pivotally mounted in the frame; a swinging cutting-plate carried by said levers in opposition to the rigid cutting-plate; a spring for swinging the levers to their open positions; said spring being in position to engage one side of the fruit; and a flexible band carried by said levers to engage the other side of the fruit and press it against said spring; substantially as specified.

2. In a fruit-picker: a suitable frame; a handle for holding the frame; a rigid cutting-plate mounted above the frame; levers pivotally mounted in the frame; a swinging cutting-plate carried by said levers in opposition to the rigid cutting-plate; a spring for swinging the levers to their open positions; said spring being in position to engage one side of the fruit; a flexible band carried by said levers to engage the other side of the fruit and press it against said spring; a cord for operating said levers; and a knife removably attached to the swinging cutting-plate; substantially as specified.

3. In a fruit-picker, a suitable frame; a flexible collapsible tube extending downwardly from the frame; an extension-handle for holding the frame; said extension-handle comprising a lower bar; an upper bar placed beside the lower bar; a loop attached to the lower end of the upper bar and encircling the lower bar; a loop attached to the upper end of the lower bar and encircling the upper bar; a clamp-loop encircling both bars intermediate of the other two loops; a thumb-screw controlling the clamp-loop so that the bars may be rigidly held in their adjusted positions; a cord-bearing in said clamp-loop; a picker mechanism in said frame; and a cord attached to the picker mechanism and extending downwardly through the cord-bearing.

In testimony whereof I have signed my name to this specification in presence of two subscribing witnesses.

GEORGE W. MERKER.

Witnesses:
 ALFRED A. EICKS,
 F. C. CRISLER.